(12) United States Patent
Jager (10) Patent No.: US 7,597,065 B2
(45) Date of Patent: Oct. 6, 2009

(54) TOY FOR ANIMALS (75) Inventor: Claudius Jager, Boulder, CO (US)

(73) Assignee: Artemis Rubber Technology Inc., Longmont, CO (US)

( * ) Notice: Subject to any disclaimer, the term of this patent is extended or adjusted under 35 U.S.C. 154(b) by 267 days.

(21) Appl. No.: 11/450,627

(22) Filed: Jun. 9, 2006

(65) Prior Publication Data
US 2007/0287355 A1 Dec. 13, 2007

(51) Int. Cl.
*A01K 29/00* (2006.01)
*A63H 3/28* (2006.01)

(52) U.S. Cl. .................................. 119/709; 446/184

(58) Field of Classification Search ............ 119/707, 119/709–711, 702; 446/184, 192, 193
See application file for complete search history.

(56) References Cited

U.S. PATENT DOCUMENTS 1,595,441 A * 8/1926 Zenger ...................... 473/571
6,439,950 B1 * 8/2002 Goldman et al. ............ 446/220
6,935,274 B1 * 8/2005 Rothschild .................. 119/702
2005/0035150 A1 * 2/2005 Laverdure ................... 222/92
2005/0282459 A1 * 12/2005 Chan et al. ................... 446/15

OTHER PUBLICATIONS

Astlett Rubber, Natural Rubber, <http://www.astlettrubber.com/nr/index.html>, as viewed by www.archive.org on Feb. 6, 2005.*

* cited by examiner

*Primary Examiner*—Michael R Mansen
*Assistant Examiner*—Stephen Brookman
(74) *Attorney, Agent, or Firm*—Robert W. Becker; Robert W. Becker & Assoc.

(57) ABSTRACT

A toy for animals, comprising an outer, hollow shell member of elastomeric material. The shell member has at least one hole to provide communication between the hollow interior and the exterior thereof. A hollow, flexible insert is disposed within the shell member and is at least partially in contact therewith. An acoustic cartridge is disposed in a port of a hollow insert.

14 Claims, 8 Drawing Sheets

TOY FOR ANIMALS

BACKGROUND OF THE INVENTION

The present invention relates to a toy for animals, especially a squeaker, squeeze toy for dogs.

SUMMARY OF THE INVENTION

The animal toy of the present application comprises an outer, hollow shell member of elastomeric material, with the shell member having at least one hole that provides communication between the hollow interior and the exterior of the shell member; a hollow, flexible insert is disposed within the shell member and is at least partially in contact therewith, the insert having a port; and an acoustic cartridge is disposed in the port of the insert.

Further specific features of the present invention will be described in detail subsequently.

BRIEF DESCRIPTION OF THE DRAWINGS

Several embodiments of the animal toy of the present application are illustrated in the drawings, which are presented by way of example only, and in which.

DETAILED DESCRIPTION OF THE INVENTION

Referring now to the drawings in detail, several exemplary embodiments of the inventive toy for animals are illustrated in the accompanying FIGS. 1-10.

Figure 1:
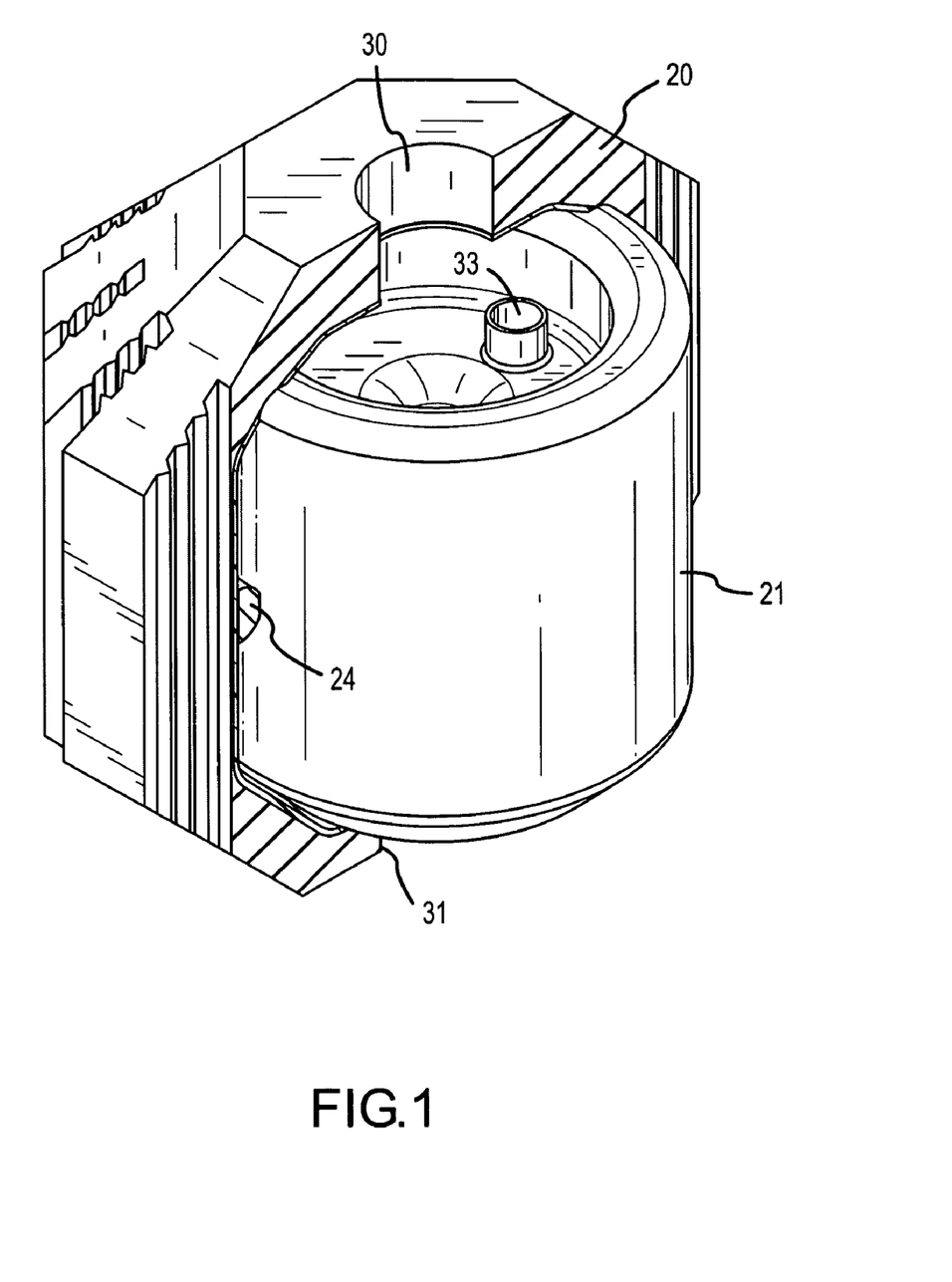
FIG. 1 is a cut-away view of an outer shell member encasing a hollow insert.

FIG. 1 shows two of the components of the toy of the present application. The outer, hollow shell member 20 is partially cut-away to show the hollow insert or bladder 21. In reality, the outer shell member 20 surrounds the insert 21, and in particular in such a way as to be in partial contact therewith, as will be described in detail subsequently. Furthermore, the shapes of the shell member 20 and of the hollow insert 21 can vary, as will also be described in detail subsequently. In principle, the shell member 20 and the insert 21 can have any desired shape (see, for example, FIGS. 1-3 and 6-10), as long as the aforementioned partial contact between them exists.

Figure 2:
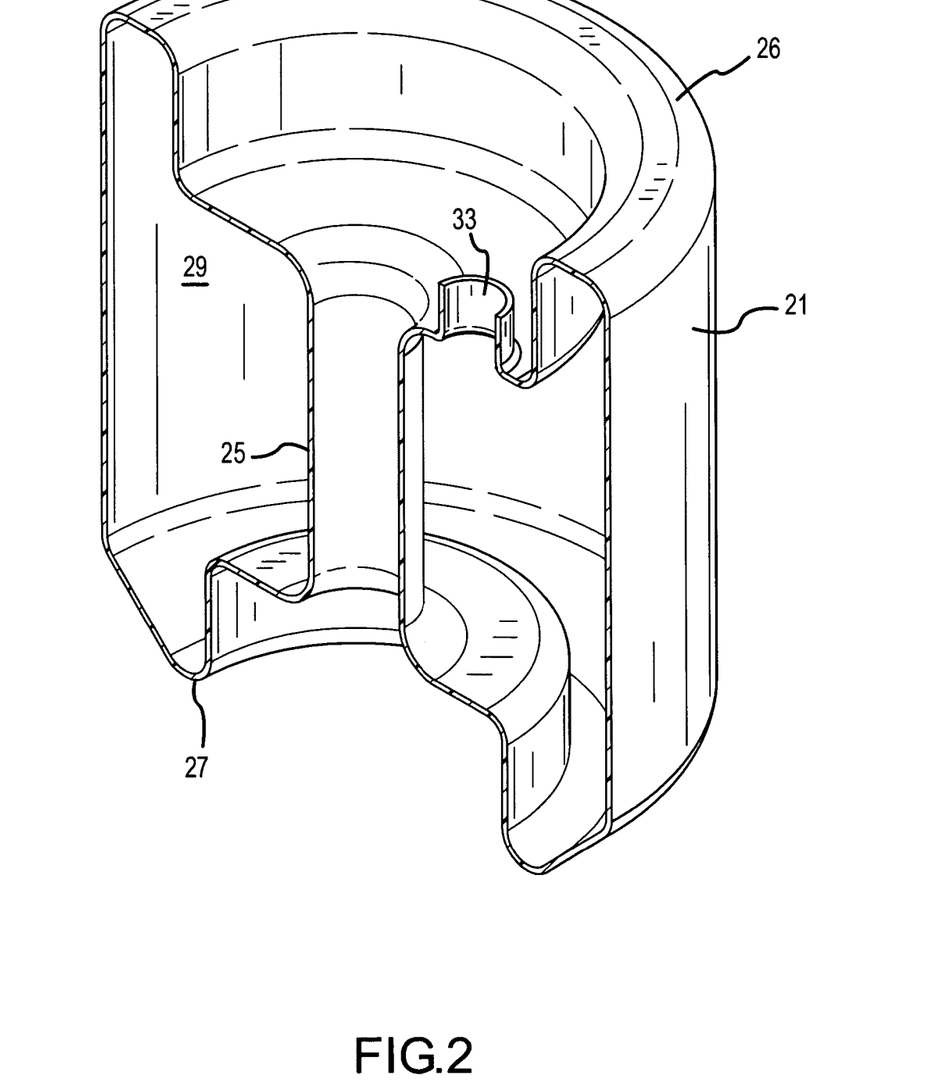
FIG. 2 is a cross-sectional view of one exemplary embodiment of a hollow insert.

In the embodiment of the toy shown in FIGS. 1 and 2, the opposite ends of the hollow insert 21, and in particular peripheral portions thereof, are in contact with the inner wall of the shell member 20, and in particular with at least 5% of the inner wall. It should be noted that although the inner contour of the shell member can conform substantially to the hollow insert 21, it is merely necessary for there to be sufficient contact between the shell member 20 and the insert 21 to keep the insert 21 in place so that the insert cannot rotate about a transverse axis and so that even a slight deformation of the elastomeric shell member 20 from the outside, for example caused by the jaws of a dog when it plays with the toy, will result in deformation of the flexible hollow insert 21, and hence will cause the acoustic cartridge 35 that is held by the hollow insert 21 (see for example FIG. 3) to squeak, as will be described in detail subsequently. Optional spacers 24 can also be provided on the inner wall of the shell member 20 to help hold the hollow insert in place.

As can be seen particularly clearly from the cut-away view of the hollow insert 21 in FIG. 2, in this embodiment not only is the insert 21 generally hollow, but it also has a central portion or core 25 that permits fluid communication from one end 26 of the insert 21 to the other end 27 thereof, yet not to the interior 29 of the hollow insert 21. Furthermore, in this embodiment the shell member 20 is provided with diametrically oppositely disposed holes or openings 30 and 31 (not necessarily of the same size). Therefore, with this embodiment, if an animal has its mouth entirely over one end of the shell member 20, for example where the hole 30 is located, the animal can still breathe due to the central core 25 of the hollow insert 21 and the hole 31 at the other end of the shell member 20. However, the shell member need not necessarily have two openings.

Figure 3:
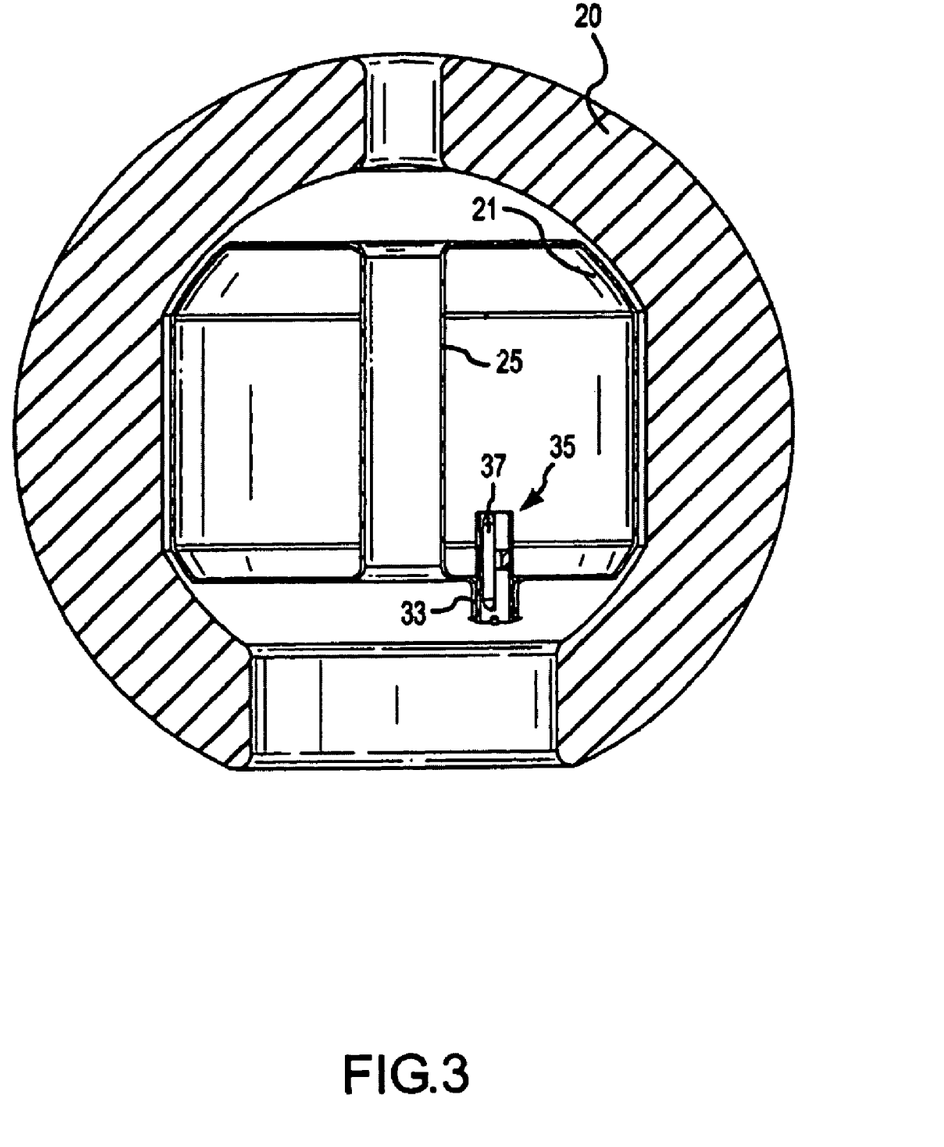
FIG. 3 is a cross-sectional view of one exemplary embodiment of the animal toy of the present application.
Figure 4:
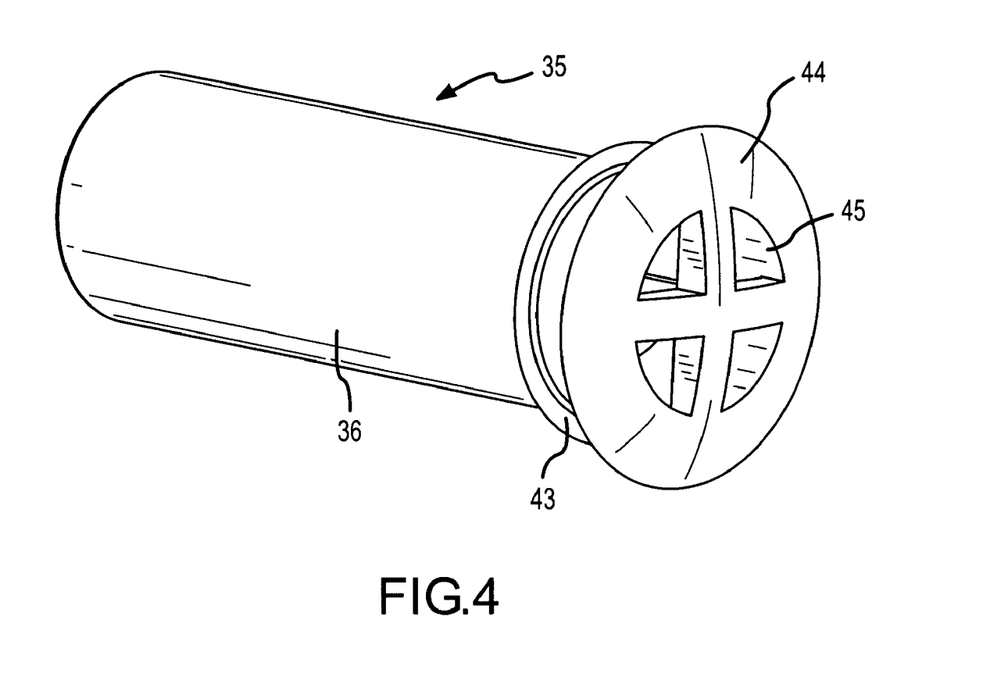
FIG. 4 shows an acoustic cartridge that is to be inserted into the port of the hollow insert.
Figure 5:
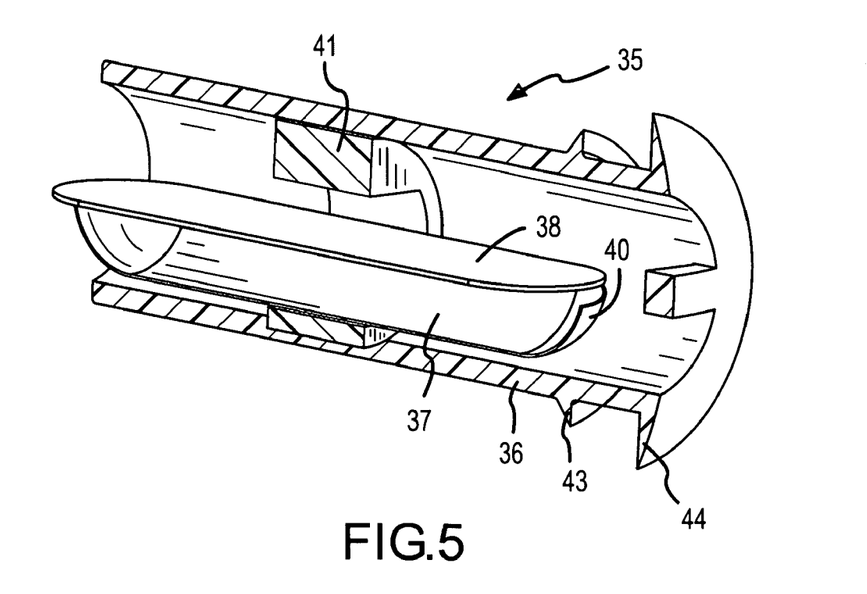
FIG. 5 is a cut-away view of the acoustic cartridge of FIG. 4.

The hollow insert 21 is also provided with a nipple or port 33 (see, for example, FIGS. 1-3) which provides fluid communication to the interior of the insert 21. In FIG. 3, which additionally illustrates a differently shaped embodiment of the outer, hollow shell member 20 and of the hollow insert 21, an acoustic cartridge 35 is disposed and held in the port 33. One exemplary embodiment of an acoustic cartridge 35 in the form of a known squeaker cartridge is here disposed in the port 33. The acoustic cartridge 35 is shown in greater detail in FIGS. 4 and 5. The main body 36 of the acoustic cartridge 35 houses an element 37. To form an acoustic chamber, the element 37 is covered by an acoustic membrane 38. An air inlet 40 into the acoustic chamber of the element is also provided. A yoke 41, which is part of the element 37, helps locate and hold the acoustic chamber member 37, 38 in place in the main body 36 of the acoustic cartridge 35. Means 43 is provided on the outer surface of the main body 36 to help maintain a press fit of the acoustic cartridge 35 in the port 33. The main body 36 is also provided with a flange member 44 to seat the acoustic cartridge 35 on the port 33 and to prevent the acoustic cartridge from being pressed into the interior of the hollow insert 21. Apertures 45 in the flange member 44 allow air to escape from the interior of the hollow insert 21 when an animal squeezes the outer shell member 20, and also allows the acoustic cartridge to function. In particular, when the shell member 20 is deformed, for example by the jaws of a dog playing with the toy, the hollow insert 21 will also be deformed, due to its contact with portions of the shell member 20, and a movement of air, for example as a pulse, will be produced within the acoustic cartridge 35, for example air flow over the acoustic membrane 38, causing the member to vibrate and generate a squeaking noise.

Figure 6:
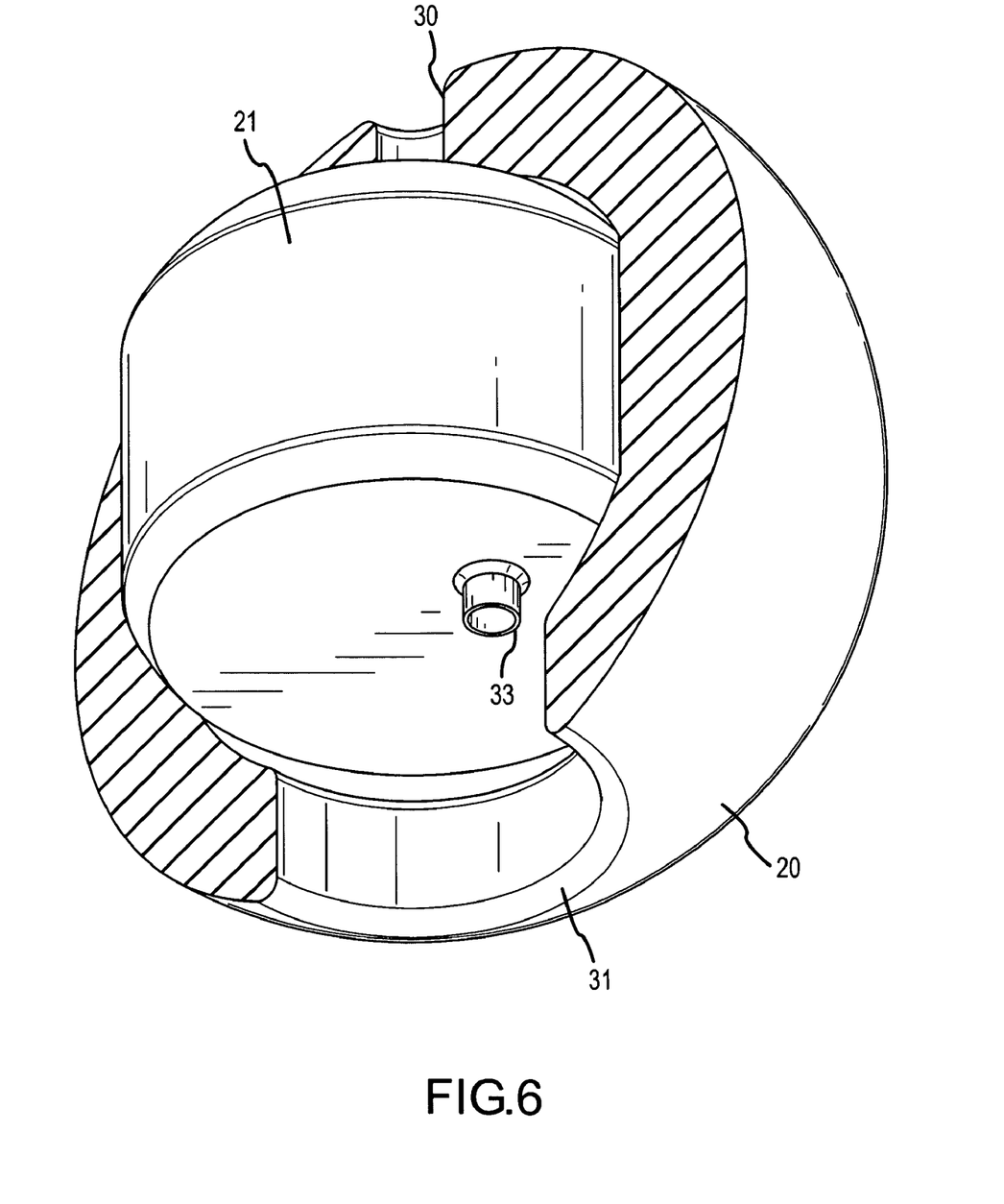
FIG. 6 shows another cut-away view of an exemplary embodiment of the inventive animal toy.
Figure 7:
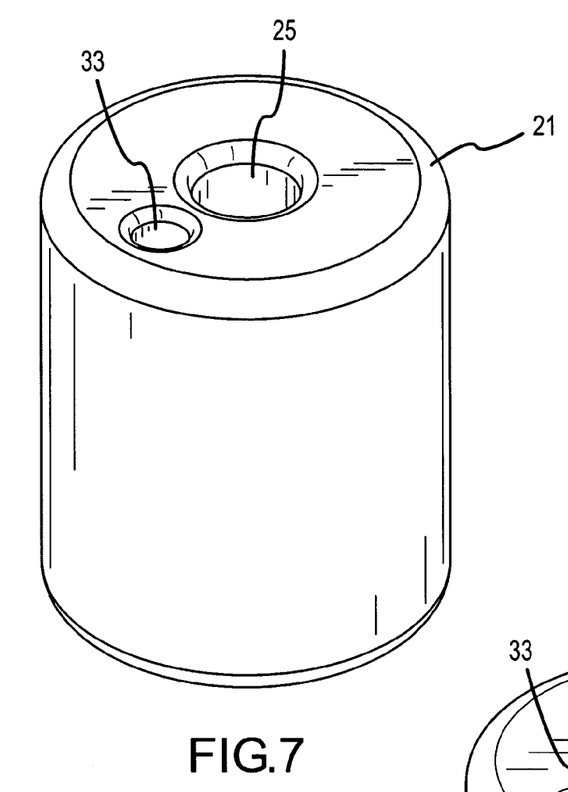
FIG. 7 shows another exemplary embodiment of a hollow insert.
Figure 8:
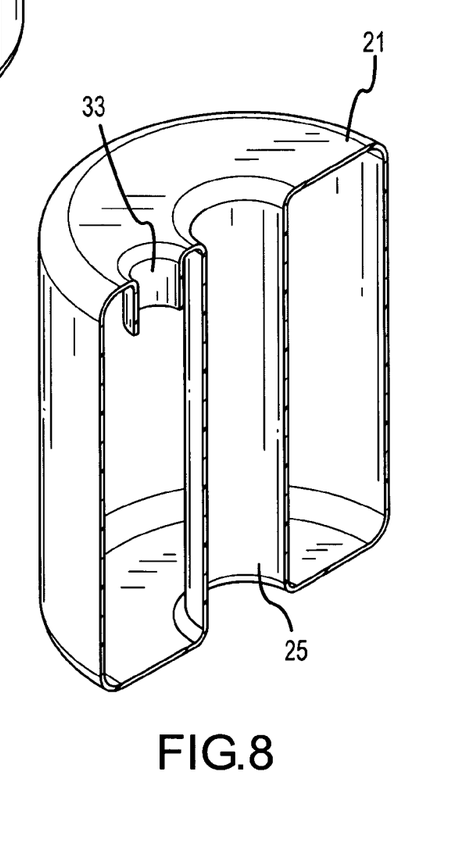
FIG. 8 is a cross-sectional view of the hollow insert of FIG. 7.

In the embodiments of the toy illustrated in FIGS. 1-3, the hollow insert 21 is provided with a central core 25. However, as shown in FIG. 6, the hollow insert 21 need not necessarily have a central core. In the embodiment of FIG. 6, only the nipple or port 33 is provided. However, in order to provide fluid communication from one end of the insert 21 to the other, it would be possible to provide one or more air grooves on an outer surface of the insert 21 and/or on an inner surface of the shell member 20.

In the previously described embodiments, the port 33 projects outwardly from the hollow insert. However, as shown in the presently preferred embodiment of FIGS. 7 and 8 and in the embodiment of FIG. 10, the nipple or port 33 can also project into the interior of the insert 21, with the exterior thereof being essentially flush with the surface in which it is located. A toy incorporating the hollow insert of FIGS. 7 and 8 or 10 operates in the same way as described in conjunction with the previous embodiments.

Figure 9:
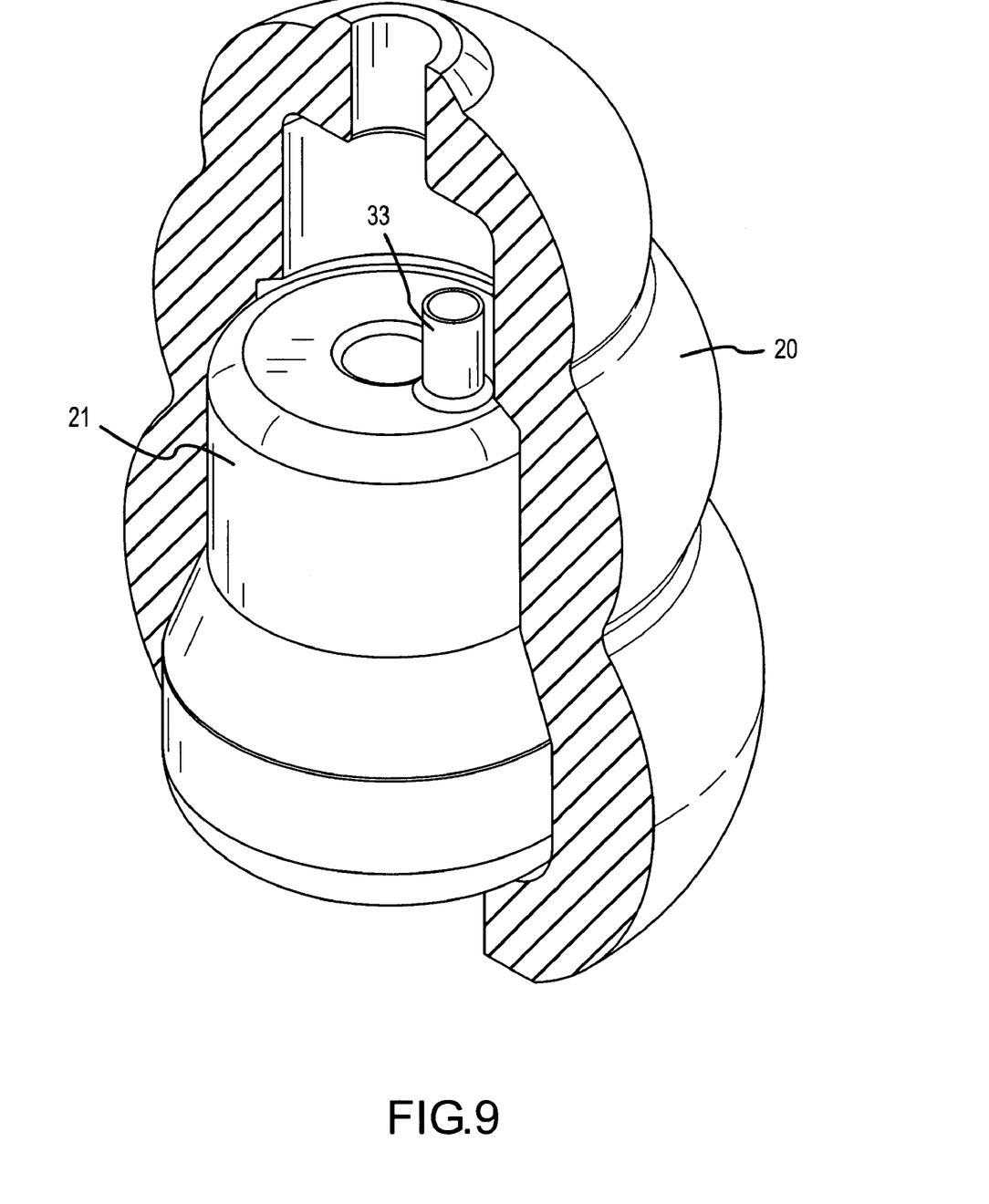
FIG. 9 shows another exemplary configuration of the inventive animal toy.
Figure 10:
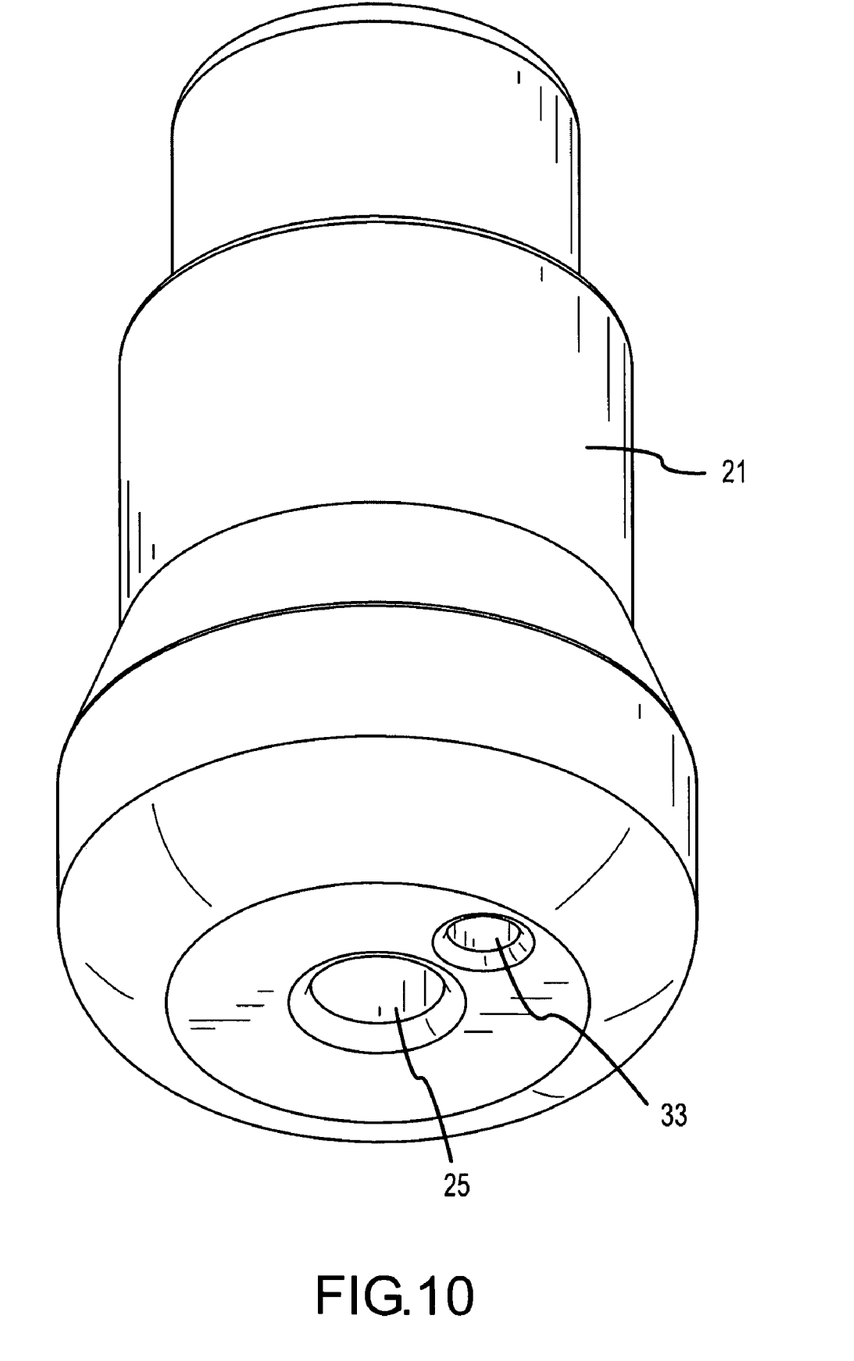
FIG. 10 shows another exemplary embodiment of a hollow insert.

FIG. 9 shows another exemplary embodiment of the toy of the present application. In this embodiment, with the exception of the end where the port 33 is located, the contour of the hollow insert 21 conforms closely to the inner contour of the outer shell member 20.

As mentioned above, the outer shell member 20 is made of elastomeric material. In particular, in order to withstand the rough play from an animal, the shell member 20 is made of a strong, tough elastomeric material, such as natural rubber or a thermoset rubber, for example SBR rubber having a Shore A hardness of 35-85.

To insert the hollow insert 21 into the shell member 20, the shell member can be stretched by up to 300%, whereupon the hollow insert 21, with or without the acoustic cartridge 35 already inserted into the port 33 of the insert, can easily be inserted through one of the holes 30 or 31 of the shell member 20 into the interior thereof. Depending upon the material of the hollow insert or bladder 21, the latter could also be inserted through one of the holes of the shell member 20 into the interior thereof in a partially collapsed state. The hollow insert 21 can then be inflated via the port 33. After inflation, the acoustic cartridge 35 can be inserted into the port 33.

In order to be able to compress or deform the hollow insert 21 to some extent for activating the acoustic cartridge 35, the hollow insert should be flexible, and is preferably made of a semi-hard material such as LDPE (low density polyethylene), HDPE (high density polyethylene) or ABS resin. At any rate, the outer shell member 20 should be more rigid than is the hollow insert 21.

The present invention is, of course, in no way restricted to the specific disclosure of the specification and drawings, but also encompasses any modifications within the scope of the appended claims.

What I claim is:

1. A toy for animals, comprising:
   an outer, hollow shell member of elastomeric material, wherein said shell member has two generally diametrically opposed holes that are each open between the hollow interior and the exterior of said shell member;
   a single hollow, generally cylindrical flexible insert disposed within said shell member and constantly in at least partial contact therewith to keep said insert in place in said shell member and prevent free floating of said insert in said shell member, wherein said hollow insert has a first hollow volume, further wherein said insert has an integral hollow central core that extends through said first hollow volume of said insert and between at least partially flat portions of opposite ends of said hollow insert, wherein said hollow central core has a substantially circular cross-sectional configuration and forms a second hollow volume that is surrounded by said first hollow volume and is separated therefrom by material of said insert so as to form a tunnel through said insert, wherein said second hollow volume of said central core is open to the hollow interior of said shell member at said flat portions of said insert, but said second hollow volume is not open to said first hollow volume of said hollow insert, and wherein said hollow insert has a port in one of said flat portions of said insert; and
   an acoustic cartridge disposed in said port of said hollow insert.

2. A toy according to claim 1, wherein said hollow insert is in the form of a bladder.

3. A toy according to claim 1, wherein said port is in the form of a nipple that is monolithic with said hollow insert and extends outwardly there from or inwardly into an interior thereof.

4. A toy according to claim 3, wherein said acoustic cartridge is held in said nipple.

5. A toy according to claim 1, wherein said hollow insert is contoured at least partially in conformance to an inner contour of said shell member.

6. A toy according to claim 1, wherein said acoustic cartridge is a squeaker cartridge.

7. A toy according to claim 6, wherein said squeaker cartridge includes an acoustic chamber member.

8. A toy according to claim 7, wherein said acoustic chamber member includes an element covered by a membrane.

9. A toy according to claim 1, wherein said shell member is more rigid than is said hollow insert.

10. A toy according to claim 9, wherein said shell member is made of a natural rubber or a thermoset rubber and has a Shore A hardness of 35-85, and wherein said hollow insert is made of LDPE, HDPE or ABS resin.

11. A toy according to claim 1, wherein spacers are disposed on at least one of said shell member and said hollow insert and are disposed between them.

12. A toy according to claim 1, wherein said hollow insert is in contact with at least 5% of an inner surface of said shell member.

13. A toy according to claim 1, wherein said central core is disposed generally centrally in said hollow insert coaxial with a central axis of said insert.

14. A toy according to claim 1, wherein said two holes of said outer shell member are generally aligned with said second hollow volume of said central core.

* * * * *